United States Patent
Ogawa

[11] Patent Number: 5,911,089
[45] Date of Patent: *Jun. 8, 1999

[54] APERTURE SIZE CHANGING APPARATUS FOR A CAMERA

[75] Inventor: Yuji Ogawa, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/803,153

[22] Filed: Feb. 19, 1997

[30] Foreign Application Priority Data

Feb. 20, 1996 [JP] Japan .................................. 8-032366

[51] Int. Cl.⁶ .................................................. G03B 17/00
[52] U.S. Cl. ........................................... 396/435; 396/436
[58] Field of Search ..................................... 396/435, 436

[56] References Cited

U.S. PATENT DOCUMENTS

| | | | |
|---|---|---|---|
| 5,335,031 | 8/1994 | Ogawa | 396/436 |
| 5,345,285 | 9/1994 | Hasushita et al. | 396/379 |
| 5,367,351 | 11/1994 | Suzuka | 396/436 |
| 5,541,684 | 7/1996 | Suzuki et al. | 396/435 |
| 5,583,594 | 12/1996 | Watanabe et al. | 396/435 |
| 5,583,599 | 12/1996 | Taguchi et al. | 396/436 |
| 5,602,606 | 2/1997 | Yazawa | 396/435 |
| 5,604,552 | 2/1997 | Ikeno | 396/436 |

*Primary Examiner*—Eddie C. Lee
*Attorney, Agent, or Firm*—Greenblum & Bernstein P.L.C.

[57] ABSTRACT

An aperture size changing apparatus for a camera includes a camera body, a photographing lens to be mounted to the camera body, and a pair of light intercepting blades for defining an aperture through which light is incident on a recording medium and which are movably positioned on a predetermined portion in the camera body. An aperture size changing device moves the light intercepting blades between a standard aperture size position and a panoramic aperture size position, and a predetermined member, is independent of, and is assembled into the camera body are provided. The predetermined member is arranged to be functionally associated with the camera body and the photographing lens. The aperture size changing device is mounted on the predetermined member so that the aperture size changing device is substantially within an orthogonal projection of an entire perimeter of the pair of light intercepting blades.

13 Claims, 2 Drawing Sheets

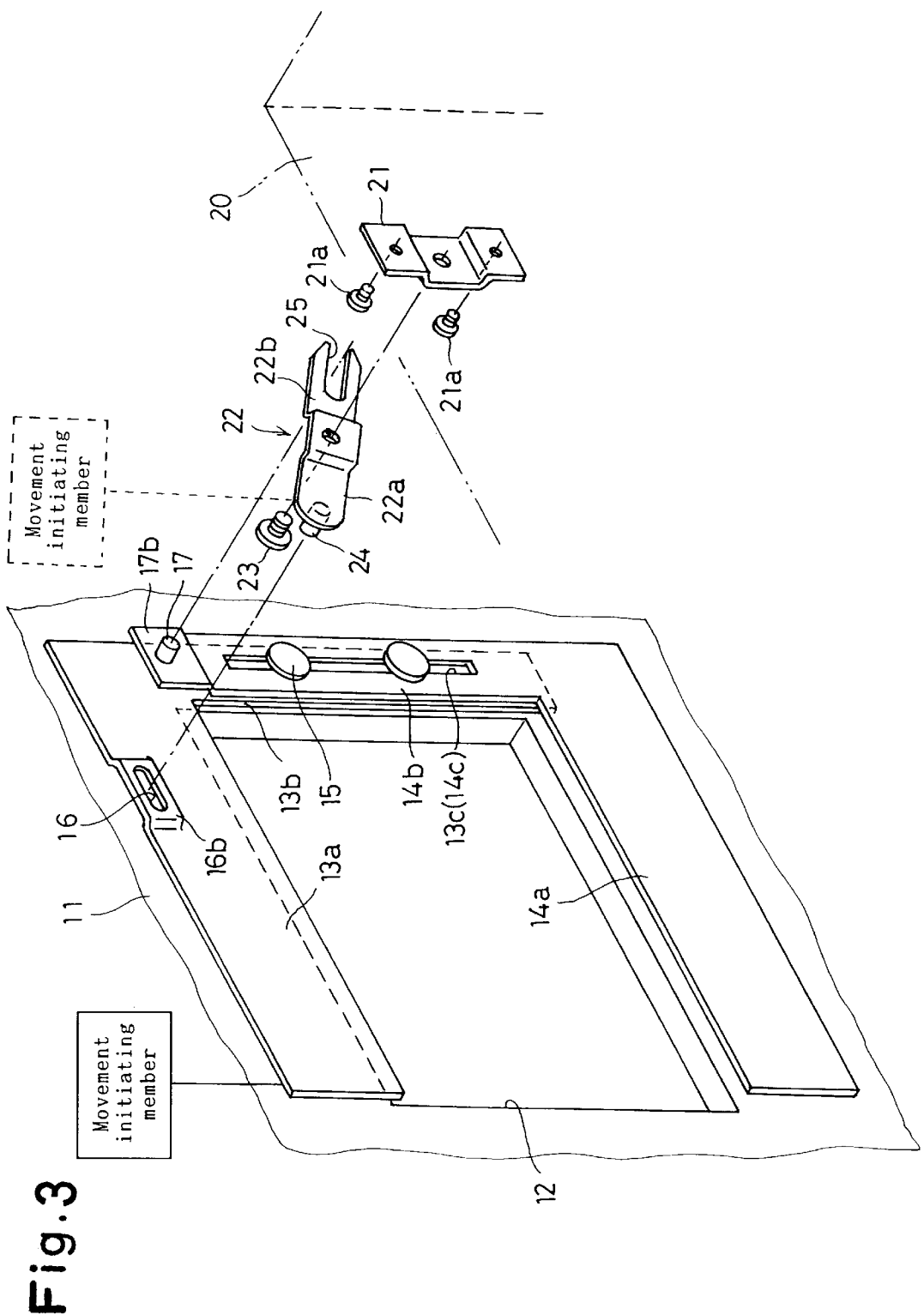

APERTURE SIZE CHANGING APPARATUS FOR A CAMERA

BACKGROUND OF THE INVENTION

1. Field of the Invention

The present invention relates to an apparatus for changing the size of an exposure area through which light is made incident on a picture plane (film, etc.) in a camera.

2. Description of the Related Art

In a known apparatus, a pair of light intercepting blades are provided in the camera body so as to be retractably moved into the aperture area, for changing a size of an exposure area with respect to a picture plane of a film and so forth. For example, the apparatus may be used to change between a standard size and a panoramic size, where a camera body is provided with an aperture which defines the standard size of aperture corresponding to a film frame. The standard size aperture is changed to the panoramic size aperture by moving the intercepting blades to block predetermined areas of the standard size aperture. The light intercepting blades are associated with each other by a driving lever. In the known aperture size changing apparatus, the length of the driving lever is relatively longer due to design-constraints of the camera body to which a photographing lens including a lens barrel is mounted. A supporting member of the driving lever has therefore been provided at a location out of a moving range of the intercepting blades. It should be understood that the moving range is generally defined as a plane parallel to the light intercepting blades and within an area formed by the entire contour of the light intercepting blades regardless of the standard/panoramic positions. The arrangement of the driving lever mentioned above has been contrary to a need for miniaturization of the camera body.

It is an object of the present invention to provide an aperture size changing apparatus which can enable provisioning of a smaller and thinner a camera body.

SUMMARY OF THE INVENTION

According to the basic concept of the present invention, the driving lever is provided on a front securing member, such as a lens block, which is made of a piece separate from the camera body and which can be mounted to the camera body from the front direction, rather than on the camera body as in the prior art. With this arrangement, the camera can be made smaller.

To achieve the object mentioned above, according to the present invention, there is provided a camera body, a photographing lens which is mounted to the camera body, a pair of light intercepting blades for defining an aperture through which light is made incident on a recording medium which are movably provided on a predetermined portion in said camera body, an aperture size changing device for moving the light intercepting blades between a standard aperture size position and a panoramic aperture size position, and a predetermined member which is independent of, and to be assembled into the camera body. In accordance with the present invention, the predetermined member is arranged to be functionally associated with the camera body and the photographing lens. In addition, the aperture size changing device is mounted on the predetermined member so that the aperture size changing device is substantially within an orthogonal projection of an entire perimeter of the pair of light intercepting blades.

The present disclosure relates to the subject matter contained in Japanese patent application No. 8-32366 (filed on Feb. 20, 1996), which is expressly incorporated herein by reference in its entirety.

BRIEF DESCRIPTION OF THE DRAWINGS

The invention will be described below in detail with reference to the accompanying drawings, in which;

FIG. 3 is an exploded perspective view of FIG. 1.

DESCRIPTION OF THE PREFERRED EMBODIMENT

Figure 2:
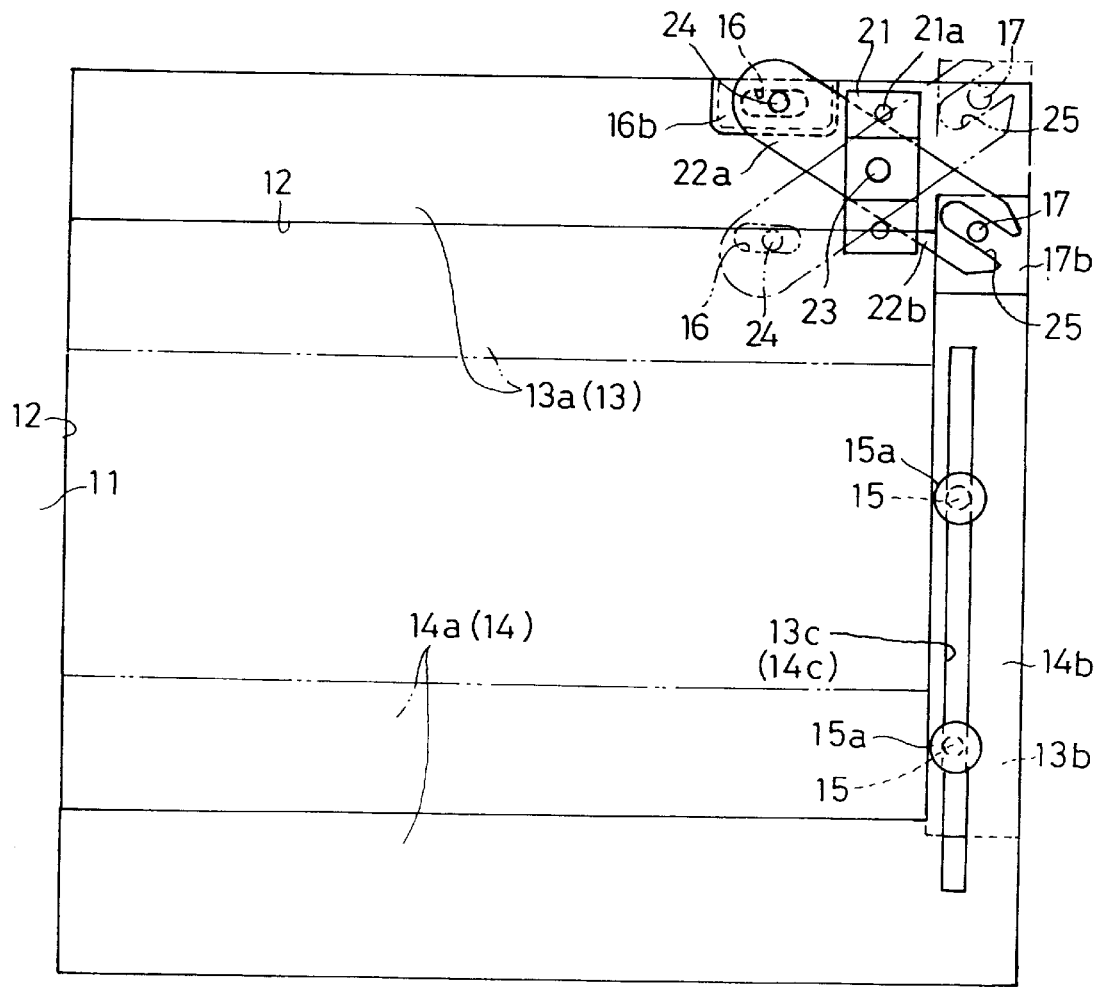
FIG. 2 is a plan view of FIG. 1.

The camera body 11 is provided with an aperture (an opening to define an exposure area) 12. The aperture 12 defines at least the minor side of the standard size of picture plane of 35 mm film. The camera body 11 is also provided with a pair of generally L-shaped light intercepting blades 13 and 14 which retractably move inwardly from the major sides of the rectangular standard size aperture 12. The light intercepting blades 13 and 14 are provided with blade portions 13a and 14a which extend along the major sides of the rectangular aperture 12, and with guide portions 13b and 14b which extend along the minor sides of the aperture 12 on the outside of the aperture 12. The guide portions 13b and 14b are arranged to overlap and are provided on the overlapped portion with elongated guide grooves 13c and 14c that extend along the minor sides of the aperture 12. A plurality of guide pins 15 provided on the camera body 11 are loosely fitted in the elongated guide grooves 13c and 14c, so that the light intercepting blades 13 and 14 can move along the length of the elongated guide grooves 13c and 14c. The movement of the light intercepting blades 13 and 14 causes the blade portions 13a and 14a to move between the panoramic size position in which the blade portions 13a and 14a are located in the aperture 12 as indicated by a phantom line in FIG. 2 and the standard size position in which the blade portions 13a and 14a are retracted from the standard size aperture 12 as indicated by a solid line.

The guide pins 15 are provided with a large diameter head portion 15a whose diameter is larger than the groove-width of the guide grooves 13c or 14c and which prevents the guide pin 15 from coming off of the guide grooves. Thus, the light intercepting blades 13 and 14 are supported on the camera body 11.

The blade portion 13a of the light intercepting blade 13 is provided with an elongated hole 16 adjacent to the guide portion 13b. The guide portion 14b of the light intercepting blade 14 is provided, on an end adjacent to the blade portion 13a, with a pin 17. As shown in FIG. 3, the elongated hole 16 and the pin 17 are provided on ridged plate portions 16b and 17b that protrude from the light intercepting blades 13 and 14. The elements mentioned above are provided on predetermined portions on the camera body 11.

As shown in FIG. 3, the light intercepting blades 13 and 14 are movable between the standard aperture size position and the panoramic aperture size position by a driving lever 22 (an aperture size changing device). The driving lever 22 is mounted on a predetermined member 20 which is made separately from the camera body, and to be assembled into the camera body. It should be understood that a function of the predetermined member 20 is not specifically required, so the member 20, for example, may be a lens block, to which a photographing lens moving mechanism which includes lens barrels, a cam ring and so forth is usually contained, or any other available individual member to be assembled into the camera body. Preferably, the member is mounted from the front side of the camera body so that the member 20 can be considered a front secured member with respect to the light intercepting blades 13 and 14. A mounting member (base) 21 is arranged to be secured to the predetermined member 20 through secured screws 21a. On the mounting member 21, a driving lever 22 is pivoted through a screw (as a pivot shaft) 23. The driving lever 22 is provided with a first arm 22a which extends toward the elongate hole 16 of the light intercepting blade 13, and a second arm 22b which extends toward the pin 17 of the light intercepting blade 14. The first arm 22a is provided with a pin 24 secured thereto, which is loosely fitted in the elongated hole 16. The second arm 22b is formed into a bifurcated fork 25, so that the pin 17 is loosely fitted in the fork 25. As can clearly be seen in FIG. 2, the pins 17, 23 and 24 are all positioned closer to one corner of the perimeter defined by the light intercepting blades than to any other corner of the perimeter and are within an orthogonal projection of the perimeter of the light intercepting blades. The mounting base 21 and the driving lever 22 are assembled in advance on the predetermined member 20.

As can be understood from the foregoing, according to the present invention, the light intercepting blades 13 and 14 are supported on the predetermined portion of the camera body 11, and the driving lever 22 is supported on the predetermined member 20. Upon mounting the predetermined member 20 to the camera body 11, the pin 24 of the first arm 22a is loosely fitted in the elongated hole 16, and the pin 17 is loosely fitted in the fork 25 of the second arm 22b to establish an association mechanism for the light intercepting blades 13 and 14. In other words, the light intercepting blades 13 and 14 and the driving lever 22 are engaged in a position shown by the solid line in FIG. 1. According to FIG. 2, it should be understood that the driving lever 22 is substantially within the moving range of the light intercepting blades 13 and 14, which is an area formed by the entire contour of the light intercepting blades 13 and 14 regardless of the standard/panoramic positions. It should also be understood that in the state of FIG. 2 the driving lever 22 is substantially within an orthogonal projection of the light intercepting blades 13 and 14 along an optical axis of a photographing lens.

Figure 1:
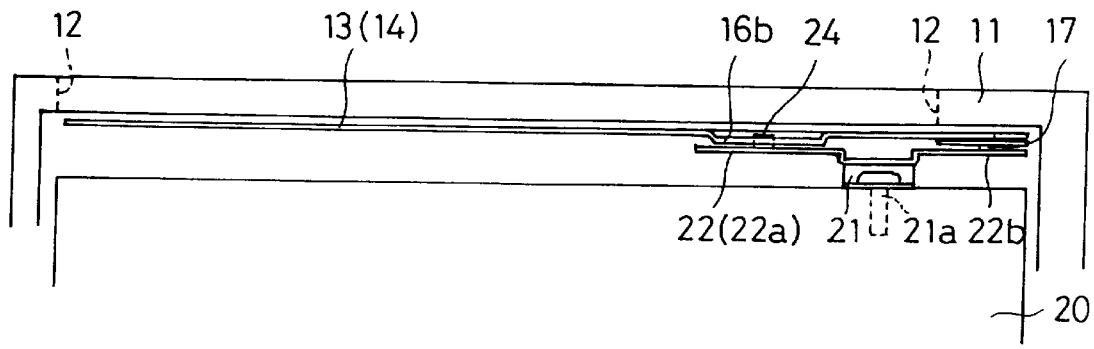
FIG. 1 is a front elevational view of a picture plane size changing apparatus according to the present invention.

In the association mechanism, when the light intercepting blade 13 is depressed from the state shown in FIG. 1, the rotation of the first arm 22a (driving lever 22) about the shaft 23 takes place in the counterclockwise direction through the engagement of the drive pin 24 in the elongated hole 16. Consequently, the second arm 22b moves the pin 17 upward through the fork 25, and hence the upward movement of the light intercepting blade 14 occurs. As it should be understood from FIG. 2, the blade portions 13a and 14a of the light intercepting blades 13 and 14 symmetrically move into the aperture 12 toward each other to a panoramic size position. Conversely, when the light intercepting blade 13 is moved upward, the association drive lever 22 rotates in the clockwise direction, so that the blade portions 13a and 14a are retracted from the aperture 12 toward the standard size position. In this embodiment, a driving force to move the light intercepting blades 13 and 14 is applied to the light intercepting blade 13 from a movement initiating member, such as a manual switch provided on the camera body and so forth. As other alternatives, as shown in FIG. 3, the initiating member is directly connected to an end portion of the driving lever 22, or the driving lever 22 is connected to the light intercepting blade 14. As explained, any mechanism to move the light intercepting blades 13 and 14 in the upward or downward direction can be employed in the present invention.

According to the present invention, since the driving lever is provided on a front secure member, such as a lens block to be mounted to the camera body from front, the entire camera body can be made smaller (thinner).

What is claimed is:

1. An aperture size changing apparatus for a camera, comprising:

a camera body;

a photographing lens mounted to said camera body;

a pair of light intercepting blades which define an aperture through which light is incident on a recording medium, said pair of light intercepting blades being movably mounted on a predetermined portion of said camera body;

an aperture size changing system that moves said pair of light intercepting blades between a standard aperture size position and a panoramic aperture size position, said aperture size changing system comprising a driving lever and a mounting member, one end of said driving lever being connected to one of said light intercepting blades, another end of said driving lever being connected to another of said light intercepting blades and said mounting member being connected to said driving lever at an intermediate position between said one end and said other end of said driving lever; and a predetermined member which is distinct from, and assembled to said camera body, said predetermined member being functionally associated with said camera body, wherein said aperture size changing system is mounted at a predetermined location on said predetermined member so that said one end, said other end and said intermediate position are each closer to one corner of a perimeter defined by light intercepting blades than to any other corner of the perimeter, said one end, said other end and said intermediate position being within an orthogonal projection of the perimeter of said pair of light intercepting blades.

2. The aperture size changing apparatus according to claim 1, wherein each of said light intercepting blades is provided with guide groove on a portion corresponding to a minor side of said aperture, and said predetermined portion of said camera body being provided with at least two guide pins to be inserted in said grooves so that said light intercepting blades are movable along said guide grooves towards said standard size position or said panoramic size position.

3. The aperture size changing apparatus according to claim 2, said driving lever being provided between said light intercepting blades and said predetermined member, said driving lever being rotatably secured to said predetermined member.

4. The aperture size changing apparatus according to claim 3, wherein said driving lever is provided with a pin at one end, and has a fork at the other end, so that said pin is arranged to be loosely fitted in an elongated hole formed on one of said light intercepting blades, and said fork is arranged to be engage a pin formed on the other light intercepting blades.

5. An aperture size changing apparatus for a camera, comprising:

a camera body;

a pair of light intercepting blades which define an aperture through which light is incident on a recording medium;

an aperture size changing system that moves said light intercepting blades between a standard aperture size position and a panoramic aperture size position, said aperture size changing system comprising a driving lever and a mounting member, one end of said driving lever being connected to one of said light intercepting blades, another end of said driving lever being connected to another of said light intercepting blades, said mounting member being connected to said driving lever at an intermediate position between said one end and said other end of said driving lever, said one end, said other end and said intermediate position each being closer to one corner of a perimeter defined by light intercepting blades than to any other corner of the perimeter; and a predetermined member which is distinct from, and assembled to said camera body, said predetermined member being functionally associated with said camera body, wherein said light intercepting blades are movably mounted on said camera body, and said aperture size changing system is movably mounted to said predetermined member so that said light intercepting blades and said aperture size changing system are directly coupled in conjunction with mounting of said predetermined member to said camera body.

6. The aperture size changing apparatus for a camera according to claim 5, wherein said light intercepting blades are mounted to said camera body, and said aperture size changing system is mounted to said predetermined member prior to mounting said predetermined member to said camera body.

7. The aperture size changing apparatus according to claim 5, wherein each of said light intercepting blades is provided with guide groove on a portion corresponding to a minor side of said aperture, and said predetermined portion of said camera body is provided with at least two guide pins to be inserted in said grooves so that said light intercepting blades are movable along said guide grooves towards said standard size position or said panoramic size position.

8. The aperture size changing apparatus according to claim 7, said driving lever being provided between said light intercepting blades and said predetermined member, and rotatably secured to said predetermined member.

9. The aperture size changing apparatus according to claim 8, wherein said driving lever is provided with a pin at one end, and provided with a fork at the other end, so that said pin is loosely fitted in an elongated hole formed on one of said light intercepting blades, and said fork engages a pin formed on the other light intercepting blades.

10. A method for assembling an aperture size changing apparatus, said method comprising:

providing a camera body;

providing a pair of light intercepting blades to form a standard aperture size and a panoramic aperture size;

providing a driving lever for moving the light intercepting blades;

connecting one end of the driving lever to one of the light intercepting blades and connecting another end of the driving lever to another of the light intercepting blades;

providing a predetermined member distinct from, and assembled into the camera body, the predetermined member being arranged to be functionally associated with the camera body;

providing a mounting member to the predetermined member, the mounting member being connected with the driving lever at a position intermediate the one end and the other end;

assembling the pair of light intercepting blades to the camera body to form a first sub-assembly, and assembling the driving lever and mounting member to said predetermined member to form a second sub-assembly; and assembling the first and second sub-assemblies so that the first end, the second end and the intermediate position of the drive lever are each closer to one corner of a perimeter defined by light intercepting blades than to any other corner of the perimeter and are within an orthogonal projection of the perimeter of the pair of light intercepting blades.

11. The method of assembling the aperture size changing apparatus according to claim 10, wherein the pair of light intercepting blades are assembled to the camera body prior to the second assembly being assembled to the first assembly.

12. The method for assembling an aperture size changing apparatus according to claim 10, wherein assembly of the first and second sub-assemblies directly connects the driving lever to the pair of light intercepting blades.

13. An apparatus for changing the size of a picture plane of a camera comprising:

a camera body having an aperture which defines the picture plane size of the camera;

a pair of light intercepting blades which are provided on the camera body to move into and out of an aperture of the camera to change the picture plane size;

a front-secured member which is a component distinct from the camera body and which can be secured to the camera body from a front direction; and an association drive lever and a mounting member which are provided on the front-secured member to associate movement of the light intercepting blades with each other in association with changing of the picture plane size, wherein one end of said association drive lever is connected to one of said light intercepting blades and another end of said association drive lever is connected to the other of said light intercepting blades, said mounting member being connected to said association drive lever at an intermediate position between said one end and said other end of said association drive lever, said one end, said other end and said intermediate position each being closer to one corner of a perimeter defined by said light intercepting blades than to any other corner of the perimeter, said association drive lever directly engaging the pair of light intercepting blades.

* * * * *